United States Patent [19]

Grendol

[11] Patent Number: 4,968,129
[45] Date of Patent: Nov. 6, 1990

[54] EYEGLASS FRAME STRUCTURES AND METHOD OF ASSEMBLING SAME

[75] Inventor: Clark L. Grendol, Sturbridge, Mass.

[73] Assignee: American Optical Corporation, Southbridge, Mass.

[21] Appl. No.: 18,746

[22] Filed: Mar. 3, 1987

Related U.S. Application Data

[63] Continuation of Ser. No. 663,869, Oct. 23, 1984, abandoned.

[51] Int. Cl.[5] ............................. G02C 5/14; B02C 5/22
[52] U.S. Cl. ..................................... 351/153; 351/121; 16/228
[58] Field of Search .................... 351/121, 153; 16/228

[56] References Cited

U.S. PATENT DOCUMENTS

| | | |
|---|---|---|
| 3,156,756 | 11/1964 | Seaver ................................. 351/153 |
| 4,076,394 | 2/1978 | Nakamura . |
| 4,084,889 | 4/1978 | Vischer, Jr. . |
| 4,145,124 | 3/1979 | Weisgerber . |
| 4,526,448 | 7/1985 | Hanson ................................ 351/153 |

FOREIGN PATENT DOCUMENTS

| | | |
|---|---|---|
| 1589632 | 10/1968 | France . |
| 2305751 | 3/1975 | France . |
| 2363807 | 9/1976 | France . |
| 638379 | 8/1947 | United Kingdom . |
| 735923 | 8/1955 | United Kingdom ................ 351/153 |

*Primary Examiner*—Rodney B. Bovernick
*Attorney, Agent, or Firm*—Fishman, Dionne & Cantor

[57] ABSTRACT

Disclosed is an eyeglass frame and method of assembling such a frame which provides for quick and easy assembly. The eyeglass frame includes a lens supporting structure and at least one temple. For each temple the lens supporting structure includes a temple receiving member having a ramped slot. Each temple includes a means for supporting a pin so that the pin extends beyond the surfaces of the temple. In assembling the frame, the pin is aligned with slots in the temple receiving member of the lens supporting structure, and the temple is forced through these slots forcing the upper and lower walls of the temple receiving member apart until the pin is captured by a hole at the end of the ramped slots.

18 Claims, 2 Drawing Sheets

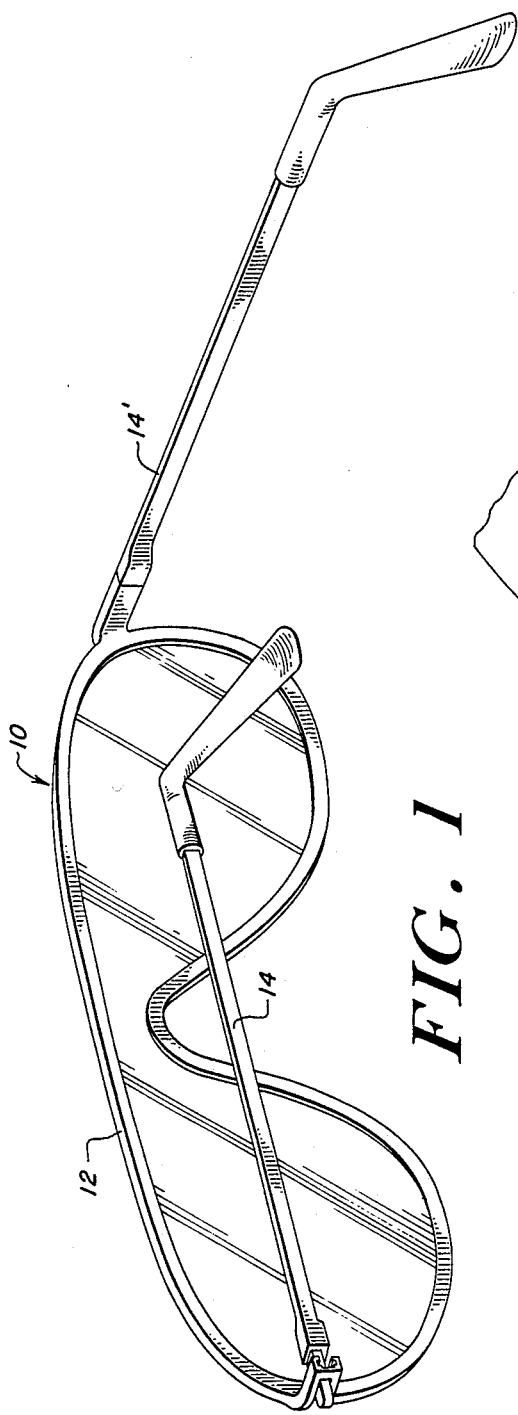
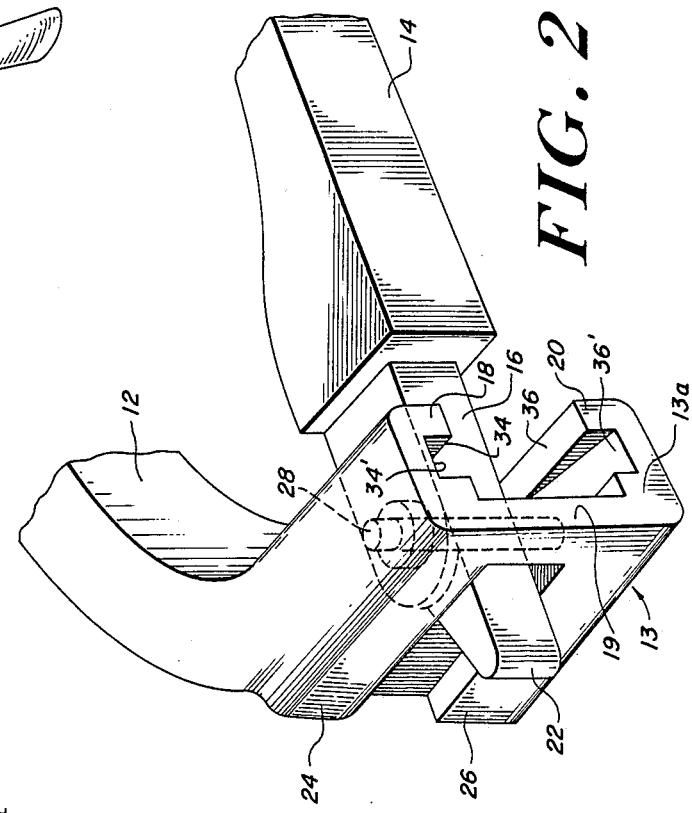

EYEGLASS FRAME STRUCTURES AND METHOD OF ASSEMBLING SAME

This application is a continuation of U.S. Pat. application Ser. No. 663,869 filed Oct. 23, 1984, now abandoned.

BACKGROUND OF THE INVENTION

This invention relates in general to eyeglass frames, and more particularly to eyeglass frames which are easily and quickly assembled.

The majority of eyeglass frames manufactured today include a lens supporting structure to which to temples are pivotably attached by means of a hinge assembly. The hinges can be metal or plastic, and a pin secures the hinge of the lens support to the hinge of the temple. The hinges are glued, screwed or fastened by some other means to the lens support and temple. Assembly of such frames utilizing metal or plastic hinges with a screw or pin assembly requires a number of manufacturing steps which complicates the assembly process.

Eyeglass frames are also manufactured using other known pivoting connecting assemblies which provide free movement of the temples from the lens supporting structure. The basic requirement for any pivoting connector assembly is that the temple movement be made easily and the pivoting assembly be strong and reliable. The principal problem with all known assemblies, as in the case of the hinge assemblies described above, is that the assemblies are rather complex. This complexity results in added hardware costs as well as added assembly costs. In addition, some of these assemblies provide inadequate strength and reliability.

It is therefore a principal object of the present invention to provide an eyeglass frame, which is easily and quickly assembled.

A further object of the present invention is to produce a eyeglass frame the components of which can be inexpensively manufactured.

Still another object of the present invention is to provide an eyeglass frame which is strong and reliable.

SUMMARY OF THE INVENTION

An eyeglass frame and method of assembling such a frame is provided in which the temple of the eyeglass frame includes a first extension portion projecting from the temple. This first extension portion includes a means to support a pin around which the temple pivots. A temple receiving member of a lens supporting structure includes upper and lower walls, the facing surfaces of which include a ramped slot. The first extension portion of the temple with the pin inserted in the pin support is aligned with the temple receiving member so that the pin slides through the ramped slots. As the temple portion is pushed further through the slots, the upper and lower walls of the temple receiving member separate until the pin falls into a pin capturing hole in the temple receiving member where it locks thereby pivotably securing the temple to the supporting structure. In an alternate embodiment, a spring loaded pin is employed, at least one end of which depresses to allow the pin to pass through the slots.

These and other features and objects of the present invention will be more clearly understood from the following detailed description of the preferred embodiment which should be read in light of the accompanying drawings.

BRIEF DESCRIPTION OF THE DRAWINGS

FIG. 1 is a perspective view of an eyeglass frame according to the present invention in which the temples are attached to the lens supporting structure through the unique hinge assembly of the present invention;

FIG. 2 is a perspective view of the hinge assembly of the eyeglass frame of the present invention;

DETAILED DESCRIPTION OF THE PREFERRED EMBODIMENTS

Figure 3:
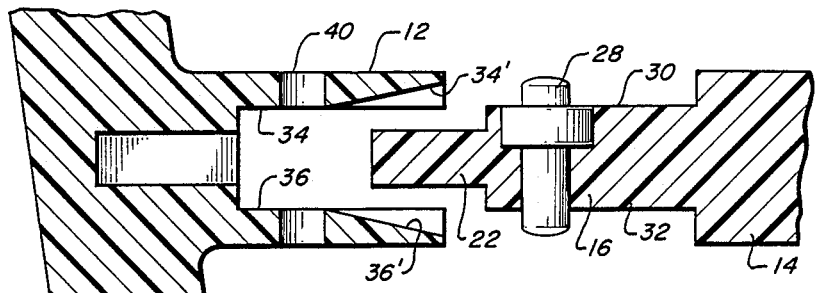
FIG. 3 is a cross sectional view of the hinge portions of the lens supporting structure and temple in an unassembled state.
Figure 4:
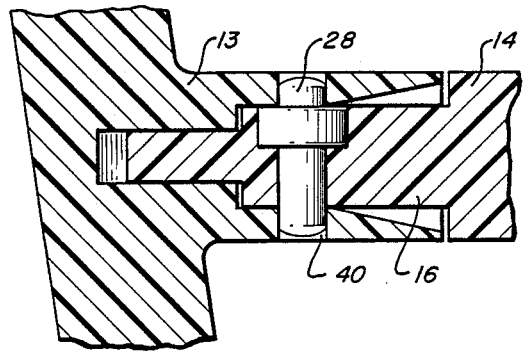
FIG. 4 is a cross sectional view similar to that of FIG. 3 in which the temple portion and lens supporting structures are fully assembled.

In accordance with the present invention, the eyeglass frame 10, shown in FIG. 1, includes a lens supporting structure 12 and two temples 14,14'. An integral temple receiving member 13 extends in a generally perpendicular direction from each end of the lens supporting structure 12, and a temple 14 is pivotally connected to each of the temple receiving members 13. The temples 14, 14' pivot between an open position which enables a user to wear the eyeglasses and support the temples with his ears and a closed position which allows the eyeglasses to be stored. In FIG. 1 temple 14 is in a closed position and temple 14' is in an open position.

The frame hinge assembly of the present invention, shown in FIG. 2, enables a temple 14 to be easily and quickly secured to the lens supporting structure 12. The end of temple 14, which in an assembled frame is interconnected with temple receiving member 13, includes a first extension portion 16 designed to fit within a first slot formed between top 18 and bottom 20 inner walls of the temple receiving member 13. Extending from this first extension portion 16 is a second extension portion 22 which is designed to fit within a second slot created between upper 24 and lower 26 outer walls of the temple receiving member 13. In the preferred embodiment, the first slot has a smaller depth than the temple 14 and the second slot has a depth smaller than the first slot. The temple 14 is fabricated so that the first extension portion 16 includes a pin receiving hole in which a pin 28 is inserted. This hole runs from the upper surface 30 of the first extension portion 16 to the lower surface 32 of the first extension portion 16 so that a pin may extend from both the upper and lower surfaces 30, 32 of the first extension portion 16.

The interior upper 34 and lower 36 surfaces of the temple receiving member 13 include a ramped slot 34', 36', with the distance between opposed, ramped surfaces of the slots 34', 36' decreasing from the end 13a of temple receiving member 13 furthest from the position where a lens is supported to the pin-receiving hole 40 of the temple receiving member 13. At the end 13a of the temple receiving member 13, the ramped surfaces are separated from each other a distance greater than the length of pin 28.

Figure 5:
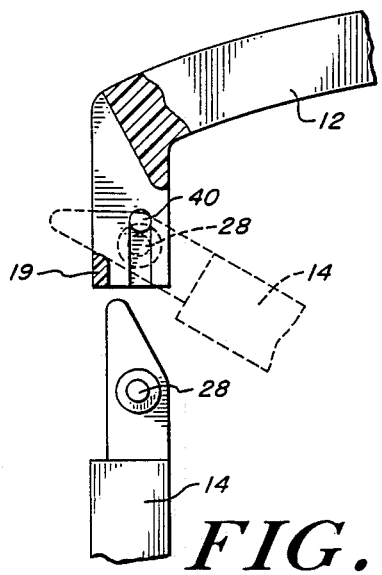
FIG. 5 is a top plan view of the eyeglass frame of the present invention showing the temple in a solid line in a position prior to assembly and showing the temple in phantom in a position during assembly.

In operation, the pin 28 is positioned so that the top end of the pin 28 slides into the upper slot 34' and the lower portion of the pin 28 slides into lower slot 36'. The temple 14, held in an open position as shown in a solid line in FIG. 5, is pushed towards the lens supporting structure 12 thereby forcing the upper and lower surfaces 34, 36 of the temple receiving member 13 apart from each other. As the temple 14 is forced closer to the lens supporting structure 12, surfaces 34, 36 continue to be separated from each other until the pin 28 falls into pin-receiving hole 40 at which point the surfaces 34, 36 collapse to substantially meet the surfaces 30, 32 of the first extension portion 16 of the temple 14. The pin 28 is then locked in hole 40. To facilitate assembly, the temple 14 may be pivoted into contact with temple angular position limiting wall 19 once the temple 14 has been partially inserted into the temple receiving member 13. As shown in phantom in FIG. 5, this pivoting action forces the pin 28 towards the pin-receiving hole 40. With the pin locked in hole 40, the frame of the present invention provides a very strong hinge since the temple can only be separated from the lens supporting structure 12 by forcing apart the upper and lower surfaces 34, 36 of the temple receiving member 13. Under normal use, such a forcing apart is virtually impossible.

Figure 6:
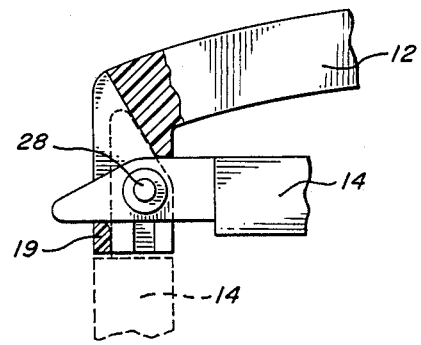
FIG. 6 is a top plan view of an eyeglass frame of the present invention in which the temple is shown in solid line in a closed position and is shown in phantom in an open position.
Figure 7:
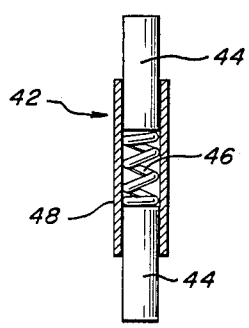
FIG. 7 is a cross-sectional view of an alternate embodiment of the connecting pin which is to be supported by the temple of the eyeglass frame of the present invention.

The temple angular position limiting wall 19 integrally positioned between the upper and lower outside walls 24, 26 operates to limit the movement of the temple 14 in both the open and closed position. As shown in FIG. 6 the temple 14 pivots from an open to closed position making contact in both the open and closed position with temple limiting wall 19.

The lens supporting structure 12 and the temples 14 are preferably fabricated from a polymer, particularly cellulose acetate propionate. The lens supporting structure 12 and/or the temples 14 may, however, be metal parts. When the lens supporting structure 12 is fabricated from a metal, the metal should be such that it will flex under the force of the pin 28 so as to allow the forcing apart of the upper and lower surfaces 34, 36 of the temple 14. It is also possible, however, to utilize a "stiffer" metal. Such a frame utilizes a pin 42 having at least one spring loaded insert 44 which depresses the spring 46 when the temple 14 is urged through the temple receiving member 13. When the pin reaches the pin-receiving hole 40, the spring 46 forces the inserts 44 outwardly from the pin housing 48 thereby locking the pin in the pin receiving hole 40. Obviously, the length of pin 42 must be greater than the closest distance between the upper and lower surfaces 34, 36 of the temple receiving member 13.

The eyeglass frame and assembly method taught by the present invention provides a sturdy and reliable eyeglass frame which is easily and quickly produced without a complex hinge assembly. As a result, both manufacturing and assembling costs are kept to a minimum thereby making the eyeglass frame a very appealing alternative to prior art eyeglass frame structures.

While the invention has been described with reference to its preferred embodiment, it is understood that various modifications and alterations will occur to those skilled in the art from the foregoing description and the drawings. In particular, it is understood that the eyeglass frame of the present invention can be produced without the extension portions 16 and 22 of the temples being recessed. Also, the frame can be manufactured from any material which will allow the upper and lower walls of the temple receiving member to spread apart upon impact of the force of the pin 28 being urged in the slot towards the lens supporting structure. Such modifications and variations which will occur to those skilled in the art are intended to fall within the scope of the appended claims.

What is claimed is:

1. An eyeglass frame which is easily and quickly assembled comprising:
   a temple having a first extension projecting from one end of said temple, said first extension including a means for supporting a pin so that ends of said pin extend from upper and lower surfaces of said first extension;
   a pin having a length greater than the distance between said upper and lower surfaces of said first extension, said pin being inserted in said pin supporting means;
   a lens supporting structure including a temple receiving member fabricated of a semi-rigid material and having means for receiving said first extension of said temple, said receiving means having opposed upper and lower interior walls each of which include a ramped slot, each of said ramped slots including an opposed surface with the distance between said opposed surfaces of said ramped slots decreasing from an end of said temple receiving member designed to abut said temple to a pin capturing means which rotatably locks said pin in said lens supporting structure, said temple receiving member also including a connecting member extending from said upper interior wall to said lower interior wall at said end of said temple receiving member designed to abut said temple, said connecting member joining said opposed upper and lower interior walls and limiting the pivoting of said temple about said pin in both direction;
   whereby said temple is inserted in said temple receiving member with each end of said pin aligned with one of said ramped slots until said pin is captured by said pin capturing means.

2. The eyeglass frame of claim 1 wherein said temple further comprises a second extension projecting from said first extension of said temple wherein the distance between upper and lower surfaces of said second extension being less than the distance between said upper and lower surfaces of said first extension.

3. The eyeglass frame of claim 2 wherein said temple receiving member of said lens supporting structure further comprises means for capturing said second extension of said temple.

4. The eyeglass frame of claim 3 wherein said means for capturing said second extension of said temple allows said second extension to project from said temple receiving member when said temple is in a closed position.

5. The eyeglass frame of claim 1 further comprising means for limiting angular pivoting movement of said temple.

6. The eyeglass frame of claim 1 wherein said temple is fabricated from a polymer.

7. The eyeglass frame of claim 1 wherein said lens supporting structure is fabricated from a polymer.

8. The eyeglass frame of claim 1 wherein said temple is fabricated from a metal.

9. The eyeglass frame of claim 1 wherein said lens supporting structure is fabricated from a metal.

10. The eyeglass frame of claim 1 wherein said pin comprises a body which houses at least one spring loaded insert, said at least one spring loaded insert being caused to depress when said pin is forced through said slots and being released outwardly when said pin is captured by said pin capturing means.

11. The eyeglass frame of claim 1 wherein said pin is a metal pin.

12. The eyeglass frame of claim 1 wherein said pin is a plastic pin.

13. The eyeglass frame of claim 1 wherein said pin is integrally fabricated into said first extension of said temple.

14. The eyeglass frame of claim 1 wherein said means for supporting said pin in said temple is a hole fabricated in said first extension of said temple.

15. A method of assembling an eyeglass frame including at least one temple and a lens supporting structure to which the temples are pivotably connected, comprising the steps of
providing a first extension portion of the temple, said first extension portion having upper and lower surfaces and a means to support a pin;
providing a
providing a pin designed to be supported by said pin supporting means and having a length greater than the distance between said upper and lower surfaces of said first extension portion;
providing a lens supporting structure having a temple receiving member for pivotably receiving member having upper and lower interior walls each of which include a ramped slot, each of said ramped slots including opposed upper and lower surfaces with the distance between said opposed upper and lower surfaces of said ramped slots decreasing from an end of said temple receiving member designed to abut said temple to a pin capturing means which rotatably locks said pin, said lens supporting structure also including a connecting member extending from said upper interior wall to said lower interior wall at said end of said temple receiving member designed to abut said temple, said connecting member joining said opposed upper and lower interior walls and limiting the pivoting of said temple about said pin in both directions, said connecting member being positioned at the end of said temple receiving member designed to abut said temple;
placing said pin support means in said first extension of the temple;
positioning said temple in an open position adjacent said temple receiving member of the lens supporting structure so that each end of said pin is aligned with one of said ramped slots;
sliding said temple into said temple receiving member of said lens supporting structure with said pin being guided by said ramped slots thereby forcing said upper and lower walls of said temple receiving member to flex in opposite directions;
stopping said sliding when said pin is captured by said pin capturing means.

16. The method of assembling an eyeglass frame of claim 15 further comprising the steps of:
pivoting said temple into a position between an open and a closed position after said temple has been inserted into said temple receiving member but before said pin has been captured by said pin capturing means thereby causing said temple to contact said connecting member; and
pivoting said temple to said closed position to forced said pin into said pin capturing means.

17. A hinge assembly for pivotably connecting two members of an eyeglass frame, said hinge assembly comprising:
a male member having a first extension projecting from one end of said male member, said first extension including a means for supporting a pin so that ends of said pin extend from upper and lower surfaces of said first extension;
a pin inserted in said pin supporting means and having a length greater than the distance between said upper and lower surfaces of said first extension;
a female member for receiving said male member, said female member being fabricated of a semi-rigid material and having means for receiving said first extension of said male member, said receiving means having opposed upper and lower interior walls each of which includes a ramped slot, each of said ramped slots including an opposed surface with the distance between said opposed surfaces of said ramped slots decreasing from an end of said female member designed to abut said male member to a pin capturing means which rotatably locks said pin in said female member, said female member also including a connecting member extending from said upper interior wall to said lower interior wall at said end of said female member designed to abut said male member, said connecting member joining said opposed upper and lower interior walls and limiting the pivoting of said male member about said pin;
whereby said male member is inserted in said female member with each end of said pin aligned with one of said ramped slots until said pin is captured by said pin capturing means.

18. A hinge assembly for pivotably connecting two members of an eyeglass frame, said hinge assembly comprising:
a male member having a first extension projecting from one end of said male member and a second extension projecting from said first extension, said first extension including a means for supporting a pin so that ends of said pin extend from upper and lower surfaces of said first extension, the distance between upper and lower surfaces of said second extension being less than the distance between said upper and lower surfaces of said first extension;
a pin inserted in said pin supporting means and having a length greater than the distance between said upper and lower surfaces of said first extension;
a female member for receiving said male member, said female mm ember fabricated of a semi-rigid material and having means for receiving said first and second extensions of said male member, said receiving means having opposed upper and lower interior walls each of which include a ramped slot, each of said ramped slots including an opposed surface with the distance between said opposed surfaces of said ramped slots decreasing from an end of said female member designed to abut said male member to a pin capturing means which rotatably locks said pin in said female member, said female member also including a connecting member extending from said upper interior wall to said lower interior wall at said end of said female member designed to abut said male member, said connecting member joining said opposed upper and lower interior walls and limiting the pivoting of said male member about said pin in both directions, said connecting member being positioned at the end of said female member designed to abut said male member;

whereby said male member is inserted in said female member with each end of said pin aligned with one of said ramped slots until said pin is captured by said pin capturing means.

* * * * *